United States Patent
Li et al.

(10) Patent No.: US 12,129,135 B2
(45) Date of Patent: Oct. 29, 2024

(54) TRANSPORTATION DEVICE FOR FRUIT AND VEGETABLE PICKING IN SOLAR GREENHOUSE

(71) Applicant: Farmland Irrigation Research Institute, Chinese Academy of Agricultural Sciences, Xinxiang (CN)

(72) Inventors: Ping Li, Xinxiang (CN); Zhenjie Du, Xinxiang (CN); Zhijie Liang, Xinxiang (CN); Yan Zhang, Xinxiang (CN); Duo Liu, Xinxiang (CN); Qing Gao, Xinxiang (CN); Zulin Zhang, Xinxiang (CN); Xuebin Qi, Xinxiang (CN)

(73) Assignee: Farmland Irrigation Research Institute, Chinese Academy of Agricultural Sciences, Xinxiang (CN)

( * ) Notice: Subject to any disclaimer, the term of this patent is extended or adjusted under 35 U.S.C. 154(b) by 627 days.

(21) Appl. No.: 17/475,381

(22) Filed: Sep. 15, 2021

(65) Prior Publication Data

US 2022/0081217 A1  Mar. 17, 2022

(30) Foreign Application Priority Data

Sep. 17, 2020  (CN) .......................... 202010980701.1

(51) Int. Cl.
  *B65G 9/00*  (2006.01)
  *A01D 46/24*  (2006.01)
  *A01G 9/24*  (2006.01)

(52) U.S. Cl.
  CPC ............. *B65G 9/002* (2013.01); *A01D 46/24* (2013.01); *A01G 9/243* (2013.01)

(58) Field of Classification Search
  CPC ........ B65G 9/002; A01D 46/24; A01G 9/243; H05K 13/0482; G01R 31/2893
  USPC ............................................ 294/82, 85, 87.1
  See application file for complete search history.

(56) References Cited

U.S. PATENT DOCUMENTS

| | | | | |
|---|---|---|---|---|
| 4,313,420 A | * | 2/1982 | Poeschl .................. | A01G 9/243 126/633 |
| 6,439,631 B1 | * | 8/2002 | Kress ................... | B65G 47/918 414/754 |
| 7,390,040 B2 | * | 6/2008 | Subotincic ........... | B25J 15/0616 414/737 |
| 7,798,546 B2 | * | 9/2010 | Kniss ................... | B25J 15/0616 294/65 |
| 7,850,217 B2 | * | 12/2010 | Lo ...................... | H05K 13/0478 414/752.1 |

(Continued)

*Primary Examiner* — Paul T Chin

(57) ABSTRACT

A transportation device for fruit and vegetable picking in a solar greenhouse is provided, which may include a guide rail, a moving mechanism and a picking box. The guide rail is horizontally fixed on side surfaces of multiple supporting columns in the solar greenhouse, an upper side and a lower side of the guide rail are respectively provided with horizontally extended sliding grooves, and a top of the moving mechanism is slidably connected to the guide rail through the sliding grooves, and the picking box is hung at a bottom of the moving mechanism. The transportation device is used to hang the picking box at a bottom of the moving mechanism, so that the moving mechanism can carry the picking box to move along the sliding grooves to transport the picking box to a destination, thereby saving time, saving labor and reducing a labor cost.

7 Claims, 1 Drawing Sheet

(56) References Cited

U.S. PATENT DOCUMENTS

| | | | |
|---|---|---|---|
| 8,038,191 B2* | 10/2011 | Shim | H05K 13/0482 |
| | | | 294/87.1 |
| 8,490,344 B1* | 7/2013 | Chen | A01G 9/14 |
| | | | 52/173.3 |
| 9,022,441 B2* | 5/2015 | Zhu | B25J 15/0616 |
| | | | 294/87.1 |
| 10,046,646 B2* | 8/2018 | Yamane | H02M 7/53875 |
| 2017/0282317 A1* | 10/2017 | Guhl | B61B 10/025 |
| 2020/0359571 A1* | 11/2020 | Pan | H02S 40/42 |

\* cited by examiner

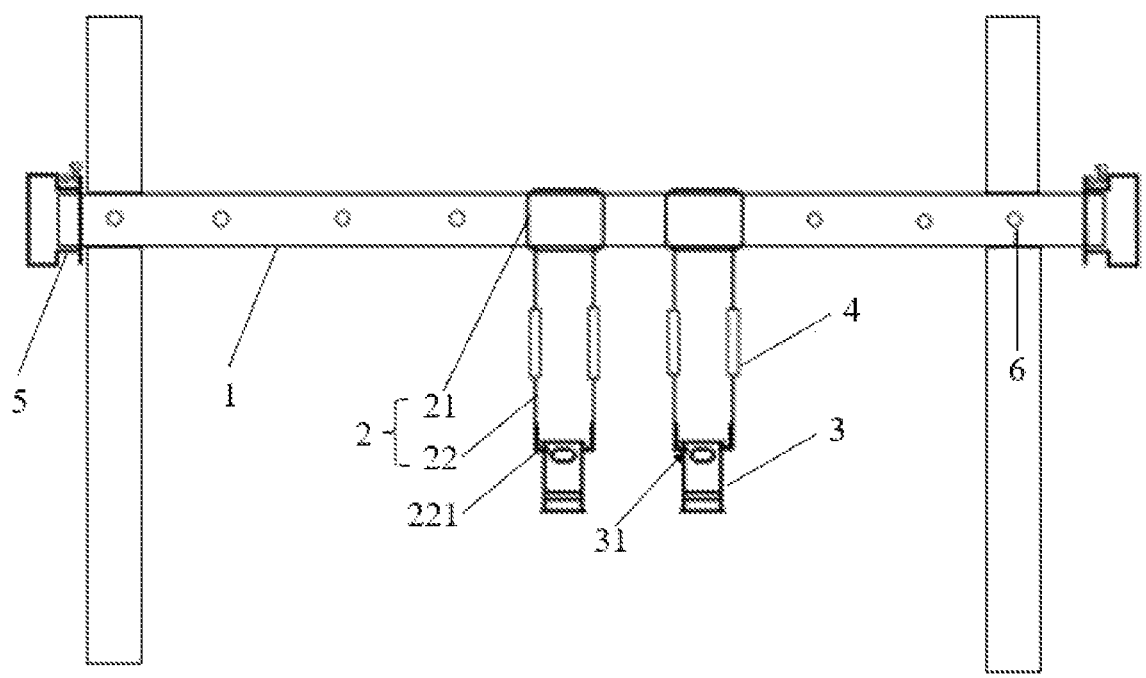

TRANSPORTATION DEVICE FOR FRUIT AND VEGETABLE PICKING IN SOLAR GREENHOUSE

FIELD OF THE DISCLOSURE

The disclosure relates to the field of solar greenhouse convenient technology management technologies, and more particularly to a transportation device for fruit and vegetable picking in a solar greenhouse.

BACKGROUND OF THE DISCLOSURE

Facility cultivated fruits and vegetables (also referred to as greenhouse fruits and vegetables) are products of effective productions by using facility cultivation with certain facilities to improve or create appropriate meteorological and environmental factors in local areas and provide good environmental conditions for the growth and development of vegetables. Because the season of vegetable facility cultivation is often difficult to achieve in open-air production, it is usually called anti-seasonal cultivation, protected field cultivation and so on. Facility cultivated vegetables are usually cultivated and planted in a solar greenhouse (also referred to as sunlight greenhouse). Multiple supporting columns are vertically installed in the solar greenhouse. The supporting columns are used to support a ceiling of the solar greenhouse to thereby stabilize its structure.

According to data released by the agricultural department, the area of facility cultivated vegetables in China has reached 58.72 million mu as early as 2016, and is expected to reach about 61.58 million mu by 2020. In terms of output and industrial scale, the total output of facility cultivated vegetables in China reached 252 million tons in 2016, and the net output value of protected vegetable industry was more than 570 billion yuan. Taking the data of 2016 as an example, in the vegetable industry, the proportion of planting area, output and output value of facility cultivated vegetables have reached 23.4%, 33.6% and 63.1% respectively. The facility cultivated vegetable industry has become the main force in China's vegetable industry; and the unit yield of facility cultivated vegetables reached 4.29 tons/mu.

At present, transportation of facility cultivated fruits and vegetables after being picked is mainly manual transportation, which is time-consuming and laborious, labor-intensive and high labor input cost. Therefore, in view of the characteristics of large picking volume, labor-intensive, time-consuming and labor-consuming transportation in the centralized picking period of protected fruits and vegetables, how to solve the picking and transportation during the centralized picking period of facility cultivated fruits and vegetables is one of the key issues that need to be solved urgently.

Therefore, how to provide a time-saving and labor-saving transportation device for fruit and vegetable picking in a solar greenhouse is an urgent problem to be solved by those skilled in the art.

SUMMARY OF THE DISCLOSURE

In view of shortcomings of the prior art, the disclosure provides a transportation device for fruit and vegetable picking in a solar greenhouse, which can reduce a labor intensity of picking and transportation during a centralized picking period of fruits and vegetables in a solar greenhouse, facilitate a transportation of fruits and vegetables after picking, and has characteristics of time-saving and labor-saving.

In order to achieve the above purpose, the disclosure adopts technical solutions as follows.

Specifically, a transportation device for fruit and vegetable picking in a solar greenhouse, which may include a guide rail, a moving mechanism and a picking box. The guide rail is horizontally fixed on side surfaces of a plurality of supporting columns in the solar greenhouse, a top of the moving mechanism is slidably connected to the guide rail, and the picking box is hung at a bottom of the moving mechanism.

The transportation device for fruit and vegetable picking in the solar greenhouse disclosed by the disclosure, the picking box is hung at the bottom of the moving mechanism, the moving mechanism carries the picking box to move along the guide rail to transport the picking box to a destination, saving time, saving labor, and reducing the labor cost.

In an embodiment, an upper side and a lower side of the guide rail are respectively provided with horizontally extended sliding grooves, and the moving mechanism is slidably arranged on the guide rail through the sliding grooves.

In an embodiment, the moving mechanism may include a sliding block and a connecting rod, the sliding block is slidably arranged on the guide rail, the connecting rod is fixedly connected to a bottom of the sliding block, the guide rail adopts a H-shaped design, the sliding block adopts a linear guide rail sliding block, and the sliding block is internally coupled to the H-shaped guide rail, which has a stable structure and a convenient operation.

In an embodiment, the bottom of the connecting rod is disposed with horizontally extended insertion holes, and two sides of a top of the picking box are disposed with horizontally extended inserting rods respectively. The inserting rods are inserted into the insertion holes to thereby hang the picking box at a bottom of the connecting rod, which is convenient for loading and unloading the picking box.

In an embodiment, the bottom end of the connecting rod is disposed with horizontally extended inserting rods, and two sides of a top of the picking box are disposed with horizontally extended provided with insertion holes respectively. The inserting rods are inserted into the insertion holes to hang the picking box at a bottom of the connecting rod. The inserting rods and the insertion holes are easy to assemble and disassemble and facilitate the loading and unloading of the picking box.

In an embodiment, a manipulation handle is installed on the connecting rod, which is used to push the picking box conveniently.

In an embodiment, the connecting rod is made of an alloy material, which has a firm structure and is not easy to deform.

In an embodiment, two ends of the guide rail are fixedly connected with blockers respectively to prevent derailment.

In an embodiment, multiple fixing screw holes are evenly arranged on the guide rail, and the guide rail is fixed on side surfaces of the multiple supporting columns by multiple fixing bolts respectively penetrating through the fixing screw holes, so as to stabilize the guide rail structure.

In an embodiment, the moving mechanism is two in number to improve a single transportation volume of fruits and vegetables, and thereby improving work efficiency.

Compared with the prior art, the embodiments of the disclosure may mainly have the following beneficial effects.

The disclosure discloses the transportation device for fruit and vegetable picking in the solar greenhouse. The connecting rod carries the picking box, the connecting rod is fixedly connected to the sliding block, and the sliding block slides in the sliding grooves in the guide rail, thereby driving the picking box to move, which can reduce the labor intensity of work contents such as picking in stages and batches during the fruit and vegetable picking period of the solar greenhouse, large picking volume, etc. Through the cooperation of the insertion holes and the inserting rods, it is convenient to load and unload the picking box, which saves labor in the links such as picking management and transportation of fruits and vegetables, save labor and labor, thereby reducing labor costs, and is easy to operate.

BRIEF DESCRIPTION OF THE DRAWING

In order to more clearly explain the embodiment of the disclosure or the technical solutions in the prior art, the drawing used in the description of the embodiments or the prior art will be briefly introduced below. It may be apparent for those skilled in the art that the drawing in the following description is some embodiments of the disclosure, and other drawings may be obtained according to the drawing without creative efforts.

The FIGURE is a schematic structural diagram of a transportation device for fruit and vegetable picking in a solar greenhouse according to an embodiment of the disclosure.

Description of reference numerals: 1-guide rail, 2-moving mechanism, 3-picking box, insertion hole 31, 4-manipulation handle, 5-blocker, 6-fixing screw hole, 21-sliding block, 22-connecting rod, inserting rod 221.

DETAILED DESCRIPTION OF EMBODIMENTS

The technical solution in the embodiment of the disclosure will be clearly and completely described below in combination with the accompanying drawing in the embodiment of the disclosure. Apparently, the described embodiments are only part of the embodiments of the disclosure, not all of the embodiments of the disclosure. Based on the embodiments of the disclosure, all other embodiments obtained by those skilled in the art without creative work belong to the protection scope of the disclosure.

Embodiment 1

The embodiment 1 of the disclosure discloses a transportation device for fruit and vegetable picking in a solar greenhouse, which may include a guide rail 1, a sliding block 21, a connecting rod 22 and a picking box 3. The guide rail 1 is fixed on the side surfaces of multiple (i.e., more than one) supporting columns of the solar greenhouse, the sliding block 21 is slidably arranged on the guide rail 1, the sliding block 21 adopts a linear guide rail sliding block, and an upper side and a lower side of the guide rail 1 are respectively provided with sliding grooves, that is, the guide rail 1 adopts a H-shaped design, and the sliding block 21 is internally coupled to the H-shaped guide rail 1, which is convenient for sliding. The connecting rod 22 is fixedly connected to a bottom of the sliding block 21. The bottom of the connecting rod 22 is disposed with insertion holes, the picking box are disposed with inserting rods, and the inserting rods are inserted into the insertion holes to hang the picking box 3 on the connecting rod 22 for easy loading and unloading of the picking box 3. A manipulation handle 4 is installed/mounted on the connecting rod 22, which is used to facilitate pushing the picking box 3. The connecting rod 22 is made of an alloy material, which has a firm structure and is not easy to deform. Two ends of the guide rail 1 are fixedly connected with blockers (also referred to as stoppers) 5 respectively to prevent the moving mechanism 2 from derailing during movement. Multiple fixing screw holes 6 are evenly arranged on the guide rail 1. The guide rail 1 is fixed on a top truss of the solar greenhouse by fixing bolts respectively penetrating through the fixing screw holes 6, and the structure is stable. The moving mechanism 2 is two in number, which can improve a single transportation volume of fruits and vegetables and thereby improving work efficiency.

Embodiment 2

The embodiment 2 of the disclosure discloses a transportation device for fruit and vegetable picking in a solar greenhouse, which may include a guide rail 1, a sliding block 21, a connecting rod 22 and a picking box 3. The guide rail 1 is fixed on the side surfaces of multiple supporting columns of the solar greenhouse, the sliding block 21 is slidably arranged on the guide rail 1, the sliding block 21 adopts a linear guide rail sliding block, and an upper side and a lower side of the guide rail 1 are respectively provided with sliding grooves, that is, the guide rail 1 adopts a H-shaped design, and the sliding block 21 is internally coupled to the H-shaped guide rail 1, which is convenient for sliding. The connecting rod 22 is fixedly connected to a bottom of the sliding block 21. The bottom of the connecting rod 22 is disposed with horizontally extended inserting rods 221. Two sides of a top of the picking box are disposed with horizontally extended insertion holes 31 respectively. The inserting rods 221 are inserted into the insertion holes 31 to hang the picking box 3 on the connecting rod 22 for easy loading and unloading of the picking box 3. That is, the difference between this embodiment and the embodiment 1 is the arrangement of the inserting rods 221 and the insertion holes 31. A manipulation handle 4 is installed on the connecting rod 22, which is used to facilitate pushing the picking box 3. The connecting rod 22 is made of an alloy material, which has a firm structure and is not easy to deform. Two ends of the guide rail 1 are fixedly connected with blockers 5 respectively to prevent the moving mechanism 2 from derailing during movement. Multiple fixing screw holes 6 are evenly arranged on the guide rail 1. The guide rail 1 is fixed on a top truss of the solar greenhouse by fixing bolts respectively penetrating through the fixing screw holes 6, and the structure is stable. The moving mechanism 2 is two in number, which can improve the single transportation volume of fruits and vegetables and thereby improving work efficiency.

A working process of the illustrated embodiments disclosed by the disclosure is as follows: a staff hangs the picking box 3 at the bottom of the connecting rod 22, the top of the connecting rod 22 is fixed on the sliding block 21, and the sliding block 21 slides along the sliding grooves in the guide rail 1. Only the staff can easily push the manipulation handle 4 to realize the movement of the picking box 3 along the guide rail 1 in the daily light and temperature room, which reduces labor intensity of the fruit and vegetable picking, transportation and other work, saves time and labor.

Each embodiment in this specification is described in a progressive manner. Each embodiment focuses on the differences from other embodiments. The same and similar parts between each embodiment can be referred to each other. For the device disclosed in the illustrated embodiment, since it corresponds to the method disclosed in the embodiment, the description is relatively simple. Refer to the description of the method section for relevant parts.

The above description of the disclosed embodiments enables those skilled in the art to realize or use the disclosure. Various modifications to these embodiments will be apparent to those skilled in the art, and the general principles defined herein can be implemented in other embodiments without departing from the spirit or scope of the disclosure. Therefore, the disclosure will not be limited to these embodiments shown herein, but will conform to the widest scope consistent with the principles and novel features disclosed herein.

What is claimed is:

1. A transportation device for fruit and vegetable picking in a solar greenhouse, comprising: a guide rail, a moving mechanism, and a picking box configured to place manually picked fruits and vegetables;
   wherein the guide rail is horizontally fixed on side surfaces of a plurality of supporting columns in the solar greenhouse, the moving mechanism is slidably arranged on the guide rail, and the picking box is hung at a bottom of the moving mechanism;
   wherein the moving mechanism comprises a sliding block and a connecting rod, the sliding block is slidably connected to the guide rail, the connecting rod is directly fixedly connected to a bottom of the sliding block, and the picking box is hung at a bottom of the connecting rod;
   wherein a manipulation handle is disposed outside the connecting rod and in direct contact with two sides of the connecting rod, and is used to push the picking box; and
   wherein the bottom of the connecting rod is disposed with horizontally extended inserting rods, two sides of a top of the picking box are disposed with horizontally extended insertion holes respectively, the inserting rods are inserted into the insertion holes to thereby hang the picking box at the bottom of the connecting rod, and the inserting rods and the insertion holes are capable of being assembled and disassembled to load and unload the picking box.

2. The transportation device according to claim 1, wherein the connecting rod is made of an alloy material.

3. The transportation device according to claim 1, wherein two ends of the guide rail are fixedly connected with blockers respectively.

4. The transportation device according to claim 1, wherein a plurality of fixing screw holes are evenly arranged on the guide rail, and the guide rail is fixed on the side surfaces of the plurality of supporting columns by a plurality of fixing bolts respectively penetrating through the fixing screw holes.

5. The transporting device according to claim 1, wherein the moving mechanism is two in number.

6. The transporting device according to claim 1, wherein the guide rail is a H-shaped guide rail, and the sliding block is linear guide rail sliding block; and the linear guide rail sliding block is internally coupled to the H-shaped guide rail.

7. A transportation device for fruit and vegetable picking in a solar greenhouse, comprising:
   a H-shaped guide rail, horizontally fixed on side surfaces of two supporting columns in the solar greenhouse;
   a moving mechanism, comprising a sliding block and a connecting rod, wherein the sliding block is internally coupled to the H-shaped guide rail and is capable of sliding along the guide rail, and the connecting rod is directly connected to a bottom of the sliding block;
   a picking box, disposed at a bottom of the connecting rod and connected to the connecting rod in a detachable manner; wherein the picking box is configured to place manually picked fruits and vegetables, the bottom of the connecting rod is disposed with horizontally extended inserting rods, two sides of a top of the picking box define horizontally extended insertion holes respectively, and the inserting rods are inserted into the insertion holes to thereby connect the picking box to the bottom of the connecting rod; and
   a manipulation handle, disposed outside the connecting rod and fixedly connected to the connecting rod, wherein the manipulation handle is disposed between the sliding block and the picking box, and the manipulation handle is configured to be gripped by a user to push the connecting rod to enable the sliding block to slide along the guide rail, thereby to drive the picking box to move between the two supporting columns.

* * * * *